US012772103B2

(12) United States Patent
Homchaudhuri et al.

(10) Patent No.: US 12,772,103 B2
(45) Date of Patent: Oct. 20, 2026

(54) ENERGY MANAGEMENT IN WIRELESS NETWORKS

(71) Applicant: QUALCOMM Incorporated, San Diego, CA (US)

(72) Inventors: Sandip Homchaudhuri, San Jose, CA (US); Michael Spartz, Poway, CA (US); Tejaswini Gollamudi, San Jose, CA (US); Manish Shukla, Milpitas, CA (US); Gyanranjan Hazarika, Milpitas, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 18/315,423

(22) Filed: May 10, 2023

(65) Prior Publication Data

US 2024/0381170 A1 Nov. 14, 2024

(51) Int. Cl.
*H04W 28/02* (2009.01)
*H04W 52/02* (2009.01)

(52) U.S. Cl.
CPC ... *H04W 28/0284* (2013.01); *H04W 52/0206* (2013.01)

(58) Field of Classification Search
CPC ......... H04W 28/0284; H04W 52/0206; H04W 76/15; H04W 84/12; H04W 76/34
See application file for complete search history.

(56) References Cited

U.S. PATENT DOCUMENTS

| | | | | |
|---|---|---|---|---|
| 2002/0101841 | A1* | 8/2002 | Kilgore | H04L 69/16 370/349 |
| 2013/0077554 | A1* | 3/2013 | Gauvreau | H04L 5/001 370/312 |
| 2013/0329619 | A1 | 12/2013 | Carty et al. | |
| 2018/0176284 | A1* | 6/2018 | Strater | H04W 40/12 |
| 2018/0206190 | A1* | 7/2018 | Cherian | H04L 1/1621 |
| 2019/0141708 | A1 | 5/2019 | Chen et al. | |
| 2021/0114616 | A1* | 4/2021 | Altman | H04W 76/15 |
| 2021/0120454 | A1 | 4/2021 | Chennichetty et al. | |
| 2022/0132423 | A1 | 4/2022 | Fang et al. | |
| 2022/0132611 | A1* | 4/2022 | Fang | H04W 84/12 |

(Continued)

FOREIGN PATENT DOCUMENTS

| | | | |
|---|---|---|---|
| CN | 112911685 | A | 6/2021 |
| CN | 108541039 | B | 10/2021 |

(Continued)

OTHER PUBLICATIONS

Channel Access Algorithms with Active Link Protection for Wireless Communication Networks with Power Control—2000 (Year: 2000).*

(Continued)

*Primary Examiner* — Nizar N Sivji
(74) *Attorney, Agent, or Firm* — Patterson & Sheridan LLP

(57) ABSTRACT

This disclosure provides methods, components, devices and systems for managing power in a wireless network. According to certain aspects, when an access point (AP) is operating on multiple links, the AP may calculate a loading metric for each link and perform one or more power savings actions if the loading metrics for one or more of the links meets certain criteria.

20 Claims, 19 Drawing Sheets

(56) References Cited

U.S. PATENT DOCUMENTS

| | | | | |
|---|---|---|---|---|
| 2022/0337338 | A1* | 10/2022 | Homchaudhuri | H04W 52/0254 |
| 2023/0155641 | A1* | 5/2023 | Kim | H04W 76/15 370/252 |
| 2023/0199551 | A1* | 6/2023 | Kim | H04W 28/082 370/229 |
| 2023/0397083 | A1 | 12/2023 | Kubota et al. | |
| 2024/0049217 | A1* | 2/2024 | Vig | H04W 28/0268 |
| 2024/0114393 | A1* | 4/2024 | Min | H04L 43/0888 |
| 2024/0114573 | A1* | 4/2024 | Ko | H04W 76/15 |
| 2025/0039688 | A1 | 1/2025 | Vasseur et al. | |
| 2025/0113297 | A1 | 4/2025 | Gollamudi | |

FOREIGN PATENT DOCUMENTS

| | | | |
|---|---|---|---|
| CN | 119605263 | A | 3/2025 |
| EP | 3446508 | B1 | 7/2022 |
| JP | 2015019141 | A | 1/2015 |
| WO | 2021003181 | A1 | 1/2021 |
| WO | 2022221849 | A1 | 10/2022 |

OTHER PUBLICATIONS

Fairness-Aware Resource Allocation in Multi-Hop Wireless Powered Communication Networks with User Cooperation—2018 (Year: 2018).*

International Search Report and Written Opinion—PCT/US2024/024789—ISA/EPO—Sep. 16, 2024.

Ramanathan R., et al., "Topology Control of Multihop Wireless Networks Using Transmit Power Adjustment", INFOCOM 2000, Nineteenth Annual Joint Conference of the IEEE Computer and Communications Societies. Proceedings, IEEE Tel Aviv, Israel Mar. 26-30, 2000, Piscataway, NJ, USA, IEEE, US, vol. 2, Mar. 26, 2000, pp. 404-413, XP010376128, Paragraphs [0041], [0050]-[0052], [0070]-[0075].

* cited by examiner

ENERGY MANAGEMENT IN WIRELESS NETWORKS

TECHNICAL FIELD

This disclosure relates generally to wireless communication, and more specifically, to techniques for power savings mechanisms in wireless networks.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure may be implemented as a method for wireless communications at a first wireless node. The method includes calculating, for each of a plurality of active links between the first wireless node and at least a second wireless node, a metric indicative of loading on that link; and performing at least a first action to inactivate a first link of the plurality of links, if a first criterion involving the metric calculated for the first link is met.

Another innovative aspect of the subject matter described in this disclosure may be implemented at an apparatus for wireless communications. The apparatus includes at least one processor; memory coupled with the processor; and instructions stored in the memory and executable by the processor to cause the apparatus to: calculate, for each of a plurality of active links between the apparatus and at least one wireless node, a metric indicative of loading on that link; and perform at least a first action to inactivate a first link of the plurality of links, if a first criterion involving the metric calculated for the first link is met.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
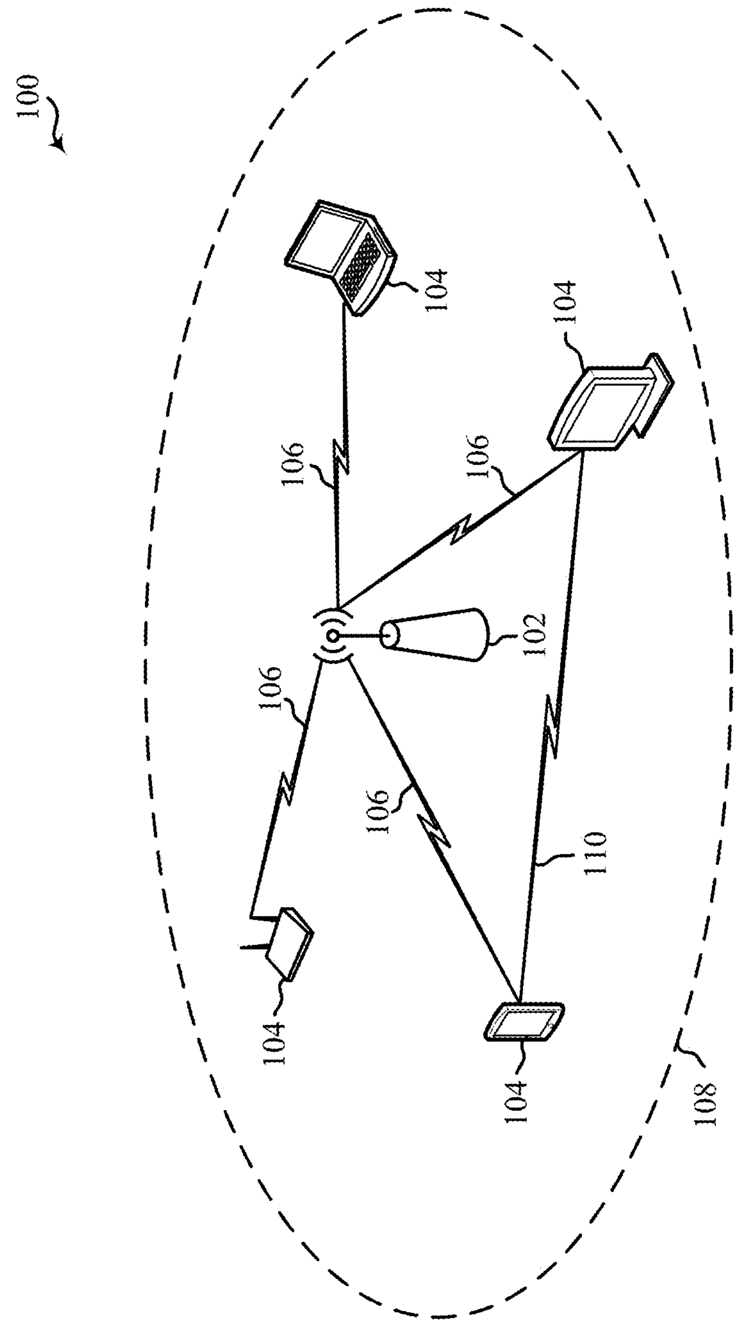
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication. Some aspects more specifically relate to power savings mechanisms in wireless networks. In some cases, the power savings mechanisms proposed herein may be used to activate/de-activate links between wireless nodes in wireless networks. As used herein, "wireless node" generally refers to any type of device capable of communicating wirelessly, such as an access point (AP), a wireless station (STA) serving as an AP (an AP-STA), a STA that is not serving as an AP (a non-AP STA), or a user equipment (UE).

Advances in wireless technology often come with some form of cost. For example, features added in each new Wi-Fi generation tend to add a greater energy toll on the access point (AP). For example, WiFi-6e (an enhanced version of 802.11ax) added an additional link (6 GHz), WiFi-7 (802.11 be) added multiple concurrent links to support multilink operation (MLO), and WiFi-8 plans to add even higher bandwidth (e.g., 640 MHz or more).

This additional power, in terms of operating watts, increases cost both to build the product and operate the product. For example, potentially expensive heat sinks and power-adapters used to accommodate the increased power may end up dominating the bill of material (BOM) cost, resulting in increased product cost and/or reduced profit margins.

Figure 5:
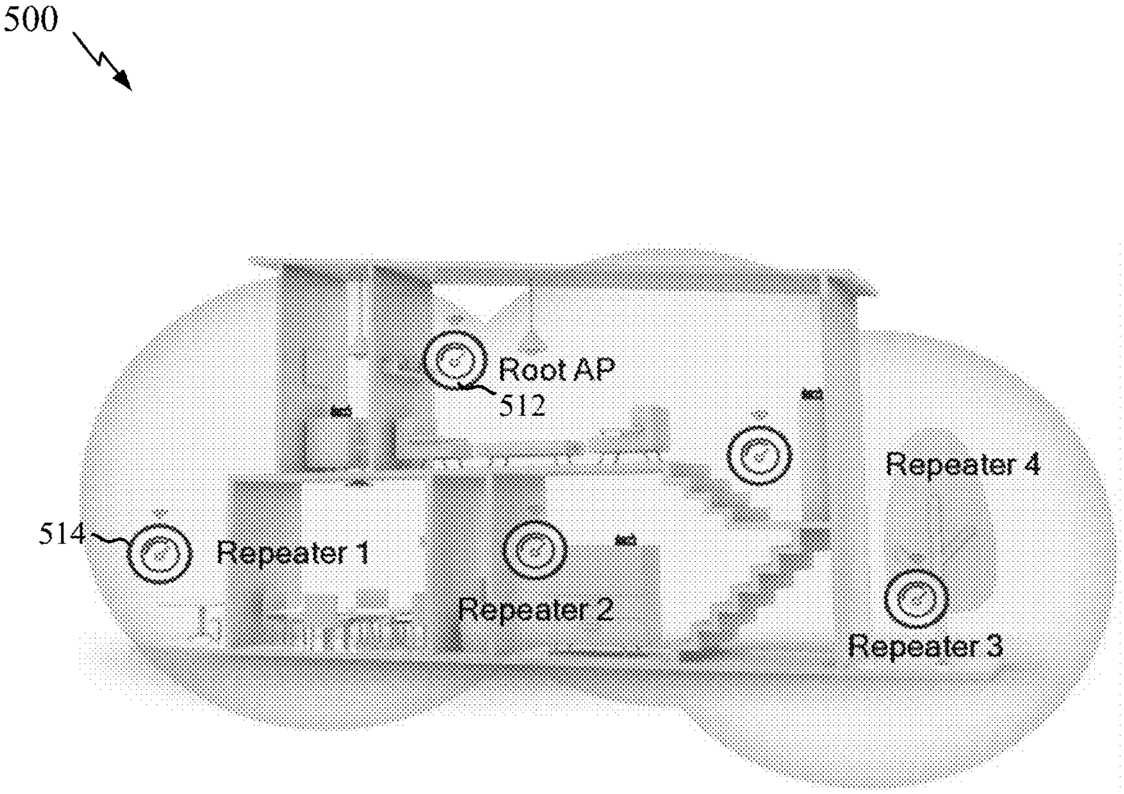
FIG. 5 shows an example scenario in which power saving mechanisms proposed herein may be utilized.

The higher energy cost may be felt by the end user, which may impact purchasing decisions. As illustrated in the example 500 of FIG. 5, a typical home may include a root AP 502 and multiple repeaters 512, forming a mesh network. Each such node may draw significant power when in an active state, increasing consumer energy bills. In some cases, the network energy cost may approach or exceed that of an appliance. Further, increased energy adds to the global carbon footprint in scenarios, for example, with always-on high output power multi-radio nodes, multi-nodes mesh networks, and the like.

Aspects of the present disclosure, however, provide power savings mechanisms that may help mitigate the increase in power consumption associated with advanced network features. According to certain aspects, when an AP is operating on multiple links, the AP may calculate a loading metric for each link and perform one or more power savings actions if the loading metrics for one or more of the links meets certain criteria. For example, if the loading metric indicates a particular link is loaded below a threshold value, that link may be inactivated, effectively coalescing the inactivated link with one or more remaining active links. In some cases, as an alternative or in addition to such link coalescing, other power savings mechanisms may be performed.

As a result, aspects of the present disclosure may help reduce overall power consumption in a network. The power savings mechanisms proposed herein may help reduce energy costs associated with operating the network. The power savings mechanisms proposed herein may also allow help avoid costly parts expensive heat sinks and power-adapters, which may help reduce the build cost.

EXAMPLE WIRELESS COMMUNICATION NETWORK

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless access point (AP) 102 and multiple wireless stations (STAs) 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHZ, 5 GHZ or 6 GHZ bands, each of which is divided into multiple 20 MHz channels. As such, these PPDUs are transmitted over a physical channel having a minimum bandwidth of 20 MHZ, but larger channels can be formed through channel bonding. For example, PPDUs may be transmitted over physical channels having bandwidths of 40 MHz, 80 MHZ, 160 or 320 MHz by bonding together multiple 20 MHz channels.

Figure 2:
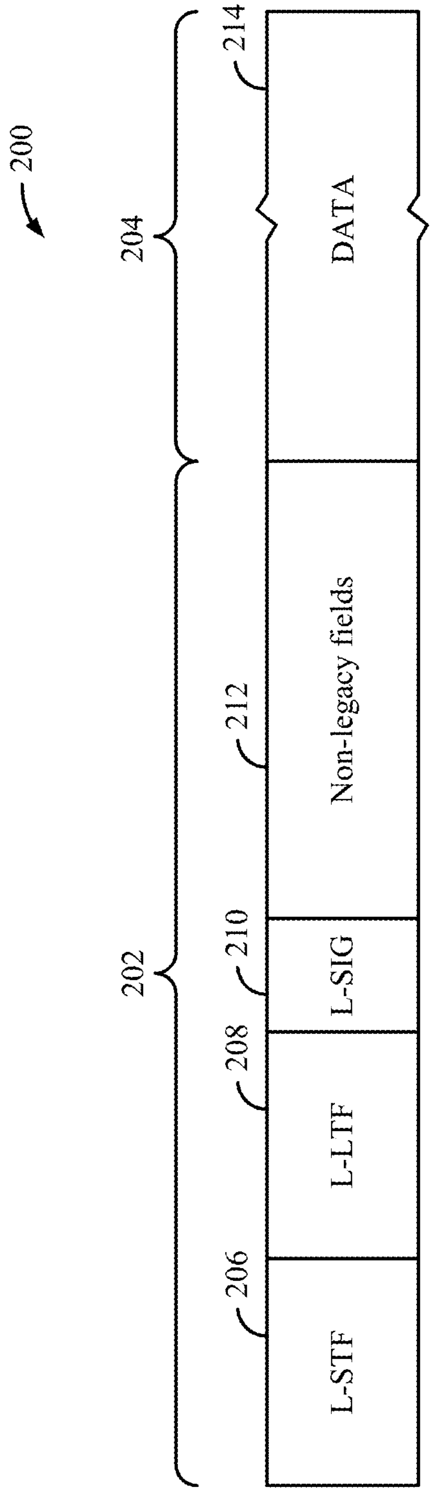
FIG. 2 shows an example protocol data unit (PDU) usable for communications between a wireless access point (AP) and one or more wireless stations (STAs).

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11*a* wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
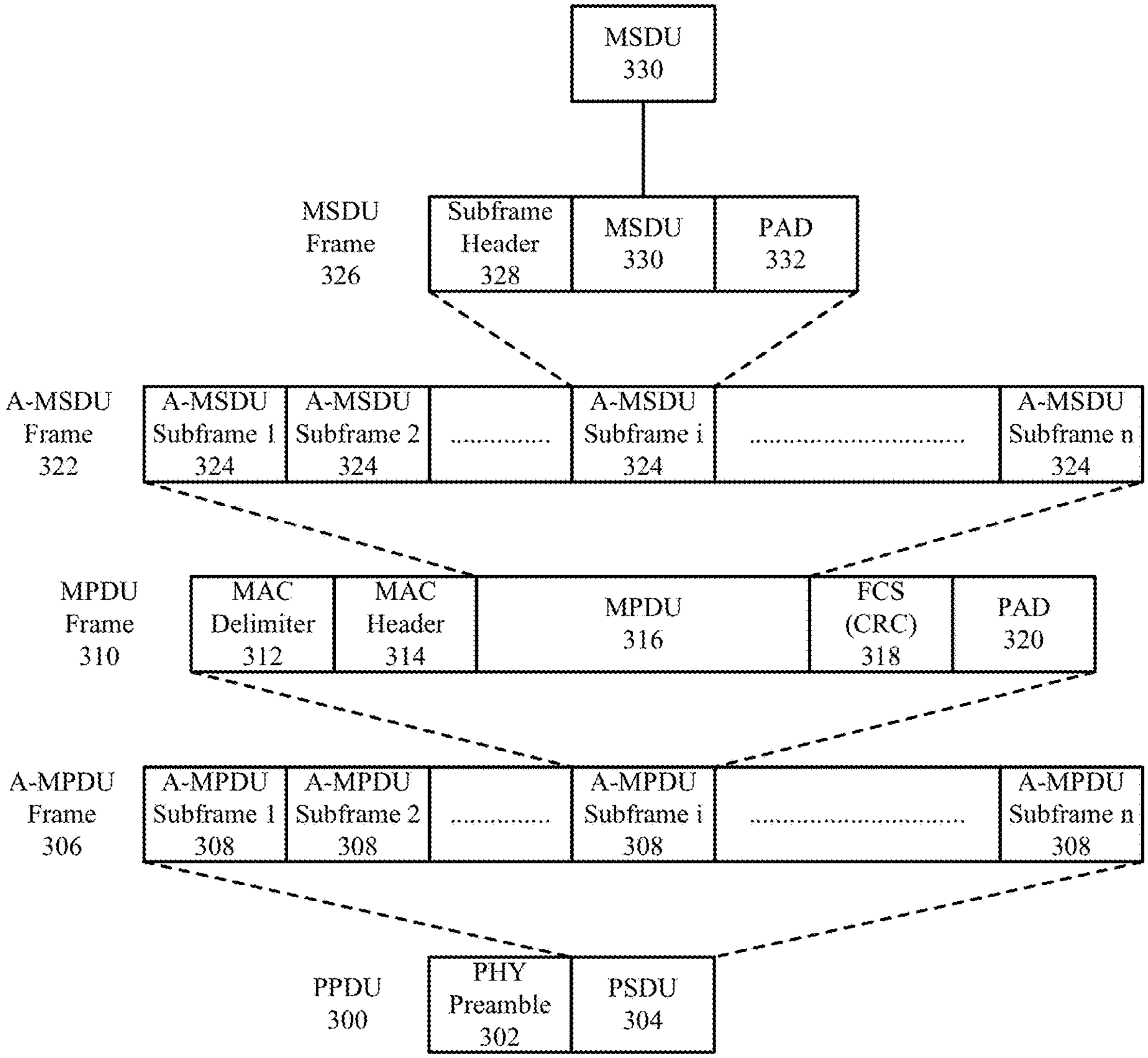
FIG. 3 shows a hierarchical format of an example physical layer PDU (PPDU) usable for communications between a wireless AP and one or more wireless STAs.

FIG. 3 shows a hierarchical format of an example PPDU usable for communications between a wireless AP 102 and one or more wireless STAs 104. As described, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which includes the data portion ("payload" or "frame body") of the MPDU frame 310. Each MPDU frame 310 also may include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Some APs and STAs may implement techniques for spatial reuse that involve participation in a coordinated communication scheme. According to such techniques, an AP may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP. The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs and their respective BSSs. subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or EDCA techniques. Additionally, by enabling a group of APs associated with different BSSs to participate in a coordinated AP transmission session, during which the group of APs may share at least a portion of a single TXOP obtained by any one of the participating APs, such techniques may increase throughput across the BSSs associated with the participating APs and may also achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, an RX power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may then be allocated resources during the TXOP as described above.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, If a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 4:
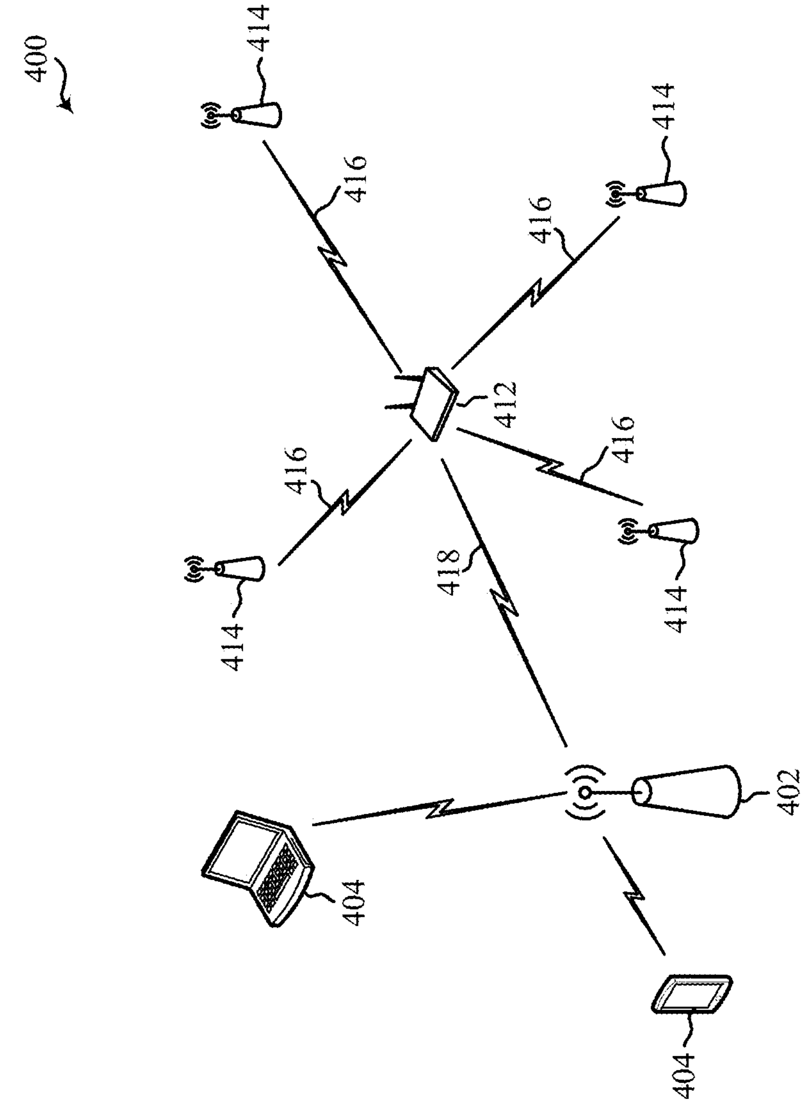
FIG. 4 shows a pictorial diagram of another example wireless communication network.

FIG. 4 shows a pictorial diagram of another example wireless communication network 400. According to some aspects, the wireless communication network 400 can be an example of a mesh network, an IoT network or a sensor network in accordance with one or more of the IEEE 802.11 family of wireless communication protocol standards (including the 802.11ah amendment). The wireless network 400 may include multiple wireless communication devices 414. The wireless communication devices 414 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 414 sense, measure, collect or otherwise obtain and process data and then transmit such raw or processed data to an intermediate device 412 for subsequent processing or distribution. Additionally or alternatively, the intermediate device 412 may transmit control information, digital content (for example, audio or video data), configuration information or other instructions to the wireless communication devices 414. The intermediate device 412 and the wireless communication devices 414 can communicate with one another via wireless communication links 416. In some examples, the wireless communication links 416 include Bluetooth links or other PAN or short-range communication links.

In some examples, the intermediate device 412 also may be configured for wireless communication with other networks such as with a Wi-Fi WLAN or a wireless (for example, cellular) wide area network (WWAN), which may, in turn, provide access to external networks including the Internet. For example, the intermediate device 412 may associate and communicate, over a Wi-Fi link 418, with an AP 402 of a WLAN network, which also may serve various STAs 404. In some examples, the intermediate device 412 is an example of a network gateway, for example, an IoT gateway. In such a manner, the intermediate device 412 may serve as an edge network bridge providing a Wi-Fi core backhaul for the IoT network including the wireless communication devices 414. In some examples, the intermediate device 412 can analyze, preprocess and aggregate data received from the wireless communication devices 414 locally at the edge before transmitting it to other devices or external networks via the Wi-Fi link 418. The intermediate device 412 also can provide additional security for the IoT network and the data it transports.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

EXAMPLE POWER SAVINGS MECHANISMS

As noted above, advances in wireless technology often come with some form of cost. Aspects of the present disclosure, however, provide power savings mechanisms that may help mitigate the increase in power consumption associated with advanced network features.

Figure 6:
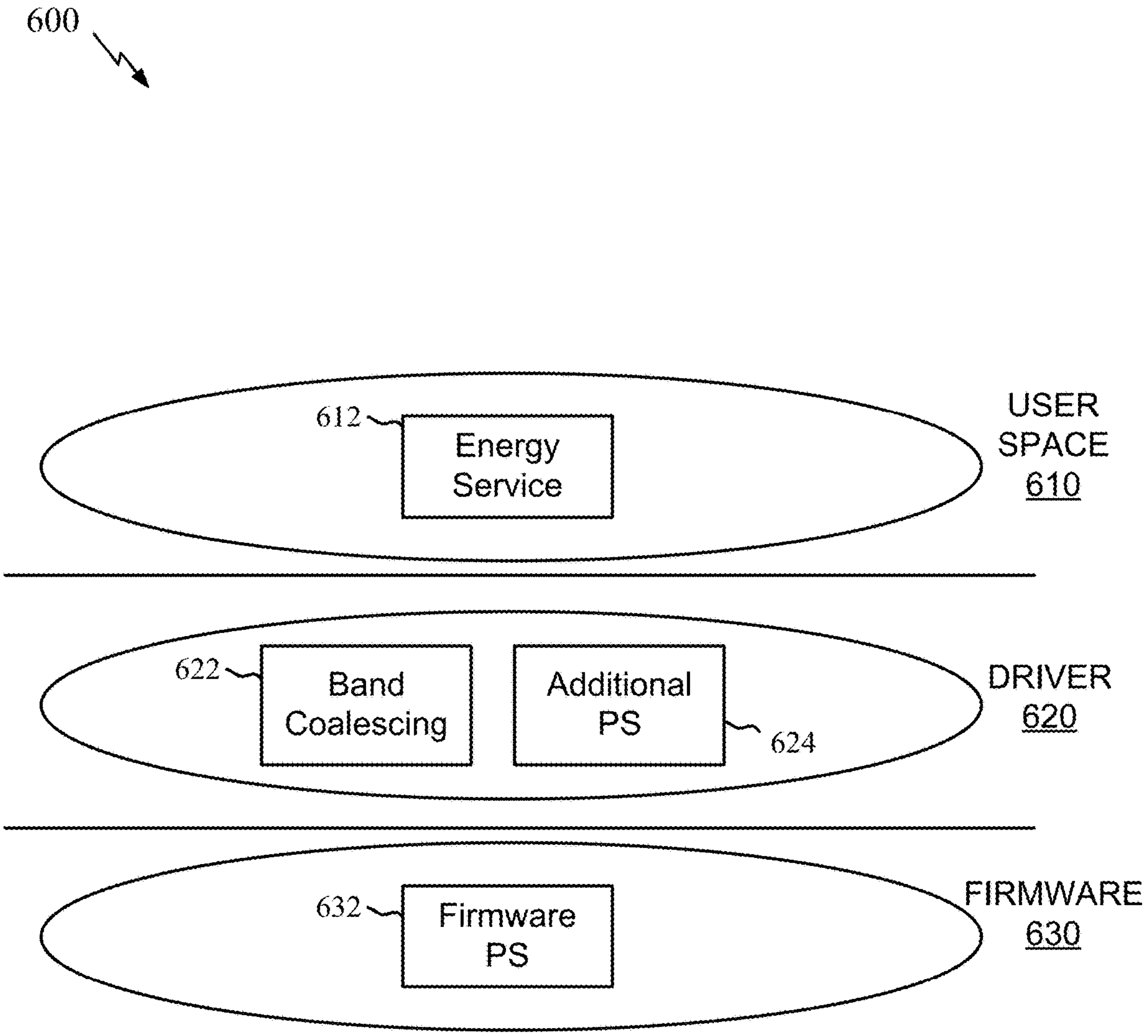
FIG. 6 shows an example architecture that may implement power saving mechanisms proposed herein.

In some cases, the power savings mechanisms proposed herein may be implemented as part of an overall AP architecture, such as the architecture 600 shown in FIG. 6. As illustrated, the architecture 600 may include an energy service 612 implemented in user space 610. The energy service 612 may support a service aware (SA) framework designed to help ensure certain quality of service (QOS) objectives, such as those related to service level agreements (SLAs) are met, within reasonable energy constraints.

The energy service generally strives to achieve the access point's power-save goals aligning with the SA-framework's SLA-goals. Such an energy service may be achieved via various algorithms described herein. In some cases, at a driver level 620, the power saving may involve various power saving mechanisms in a WLAN driver, Ethernet driver, or other driver platform. The WLAN driver power saving mechanisms may include band coalescing 622, which generally refers to inactivating one link, effectively merging that link with one or more other links. Such coalescing may be achieved using mechanisms such as TID to link mapping (T2LM), BSS transmission management (BTM), and/or link utilization (LU) mechanisms. Additional power savings mechanisms 624 may include RF chain reduction and bandwidth reduction. In some cases, a driver (e.g., 802.3az) may be used for certain signaling and control. At the firmware level 630, power saving may be achieved via various PS mechanisms 632, such as chain reduction, rate control, and dynamic bandwidth reduction.

Figure 7:
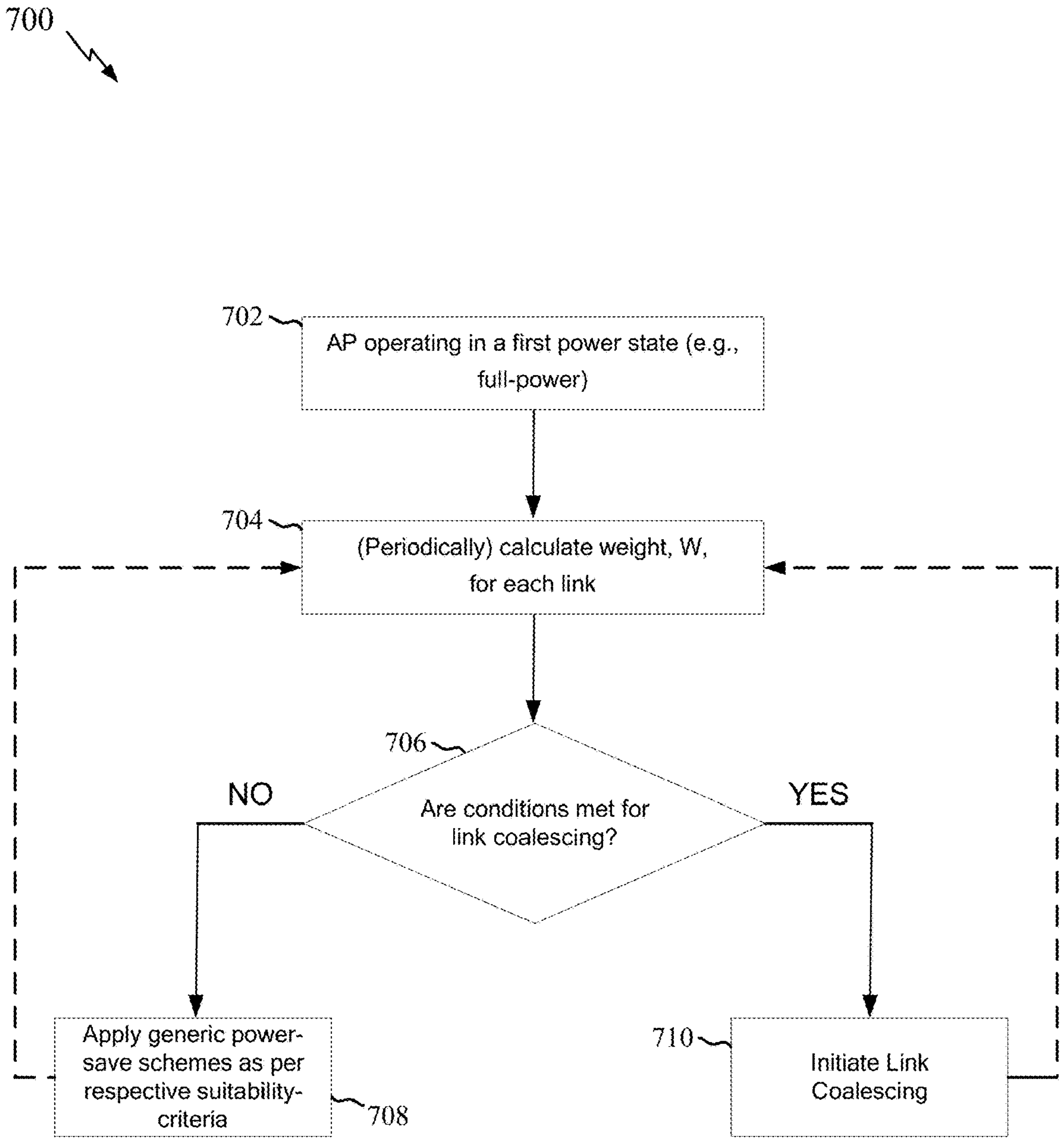
FIG. 7 shows a flow diagram illustrating an example of a power saving mechanism, in accordance with certain aspects of the present disclosure.
Figure 8:
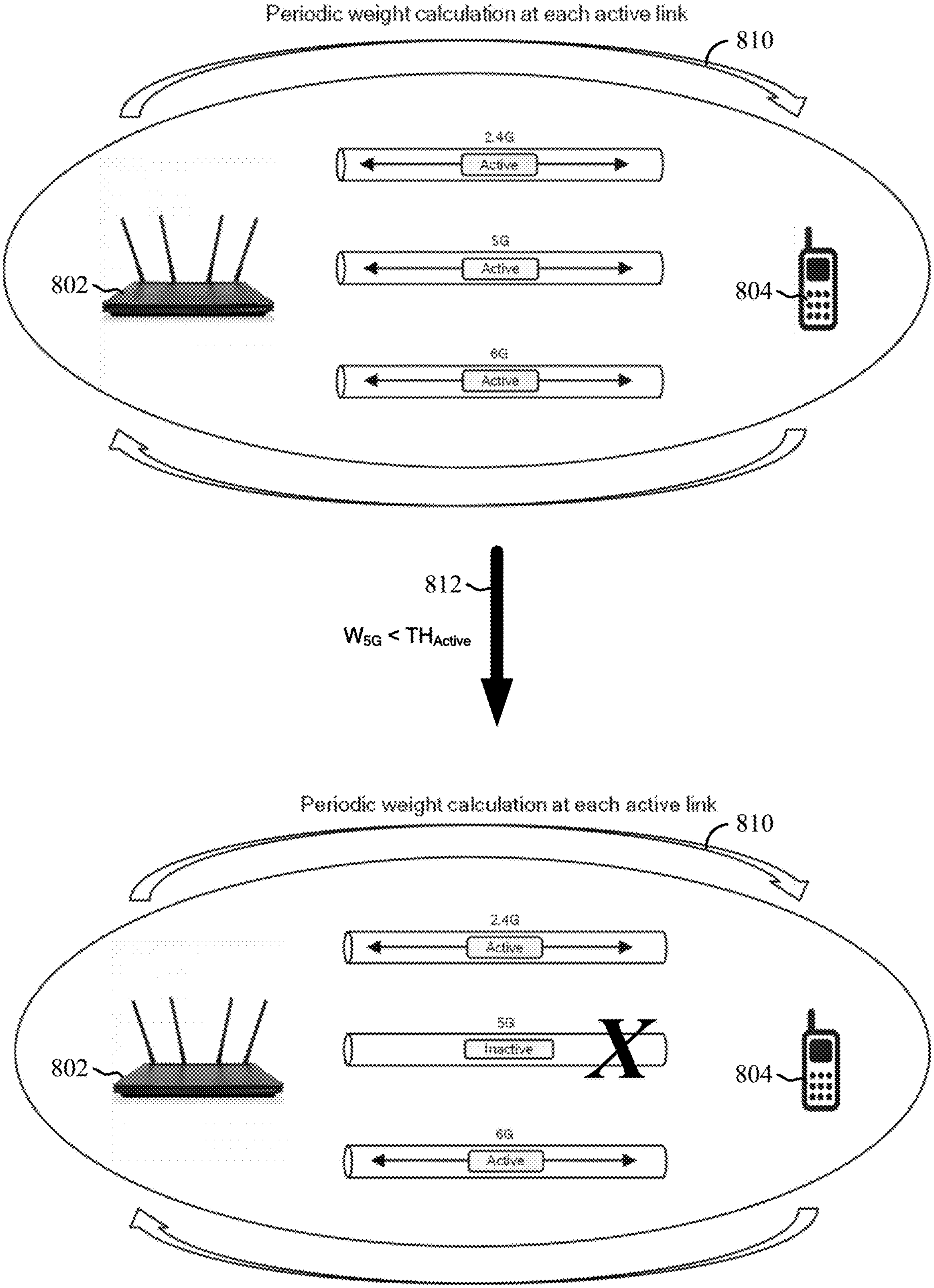
FIG. 8 shows a diagram illustrating an example of a power saving mechanism, in accordance with certain aspects of the present disclosure.

Power savings mechanisms proposed herein may be understood with reference to the flow diagram 700 of FIG. 7 and the diagrams in FIG. 8. The AP 802 in FIG. 8 may perform operations shown in FIG. 7.

As shown at 702, an AP may be operating in a first power state, such as a full power state (e.g., with few or no power saving mechanisms currently utilized). This may correspond to the top diagram shown in FIG. 8, with the AP 802 communicating with a STA 804 using multiple active links (2.4 GHz, 5 GHZ, and 6 GHz).

As shown at 704, the AP may calculate a weight, W, for each link. The weight may be considered a metric representative of loading on that link and may be calculated based on various parameters. As shown at 810 in FIG. 8, the weights for each active link may be calculated periodically.

If one or more conditions are met for link coalescing, based on the weights, the AP may initiate link coalescing, at 710. If the conditions are not met, one or more other power-save schemes may be applied, at 708, if certain criteria are met. The other power-save schemes may be considered less drastic than inactivating a link via link coalescing but may still result in significant power saving. The other power-save schemes may be used as an alternative or in addition to link coalescing. In other words, even if one link is inactivated, the power-save schemes may be applied to one or more remaining active links.

In some cases, link coalescing may be initiated if a weight for a given link is below a threshold level. The threshold may be set to a level that indicates relatively low loading and that, the resulting power saving from inactivating the link may more than offset any loss in performance. In the example shown in FIG. 8, the weight calculated for the 5 GHz link ($W_{5G}$) falls below the threshold level ($W_{5G}<TH_{Active}$). Therefore, as indicated in the bottom diagram, the 5 GHz in inactivated.

Figure 9:
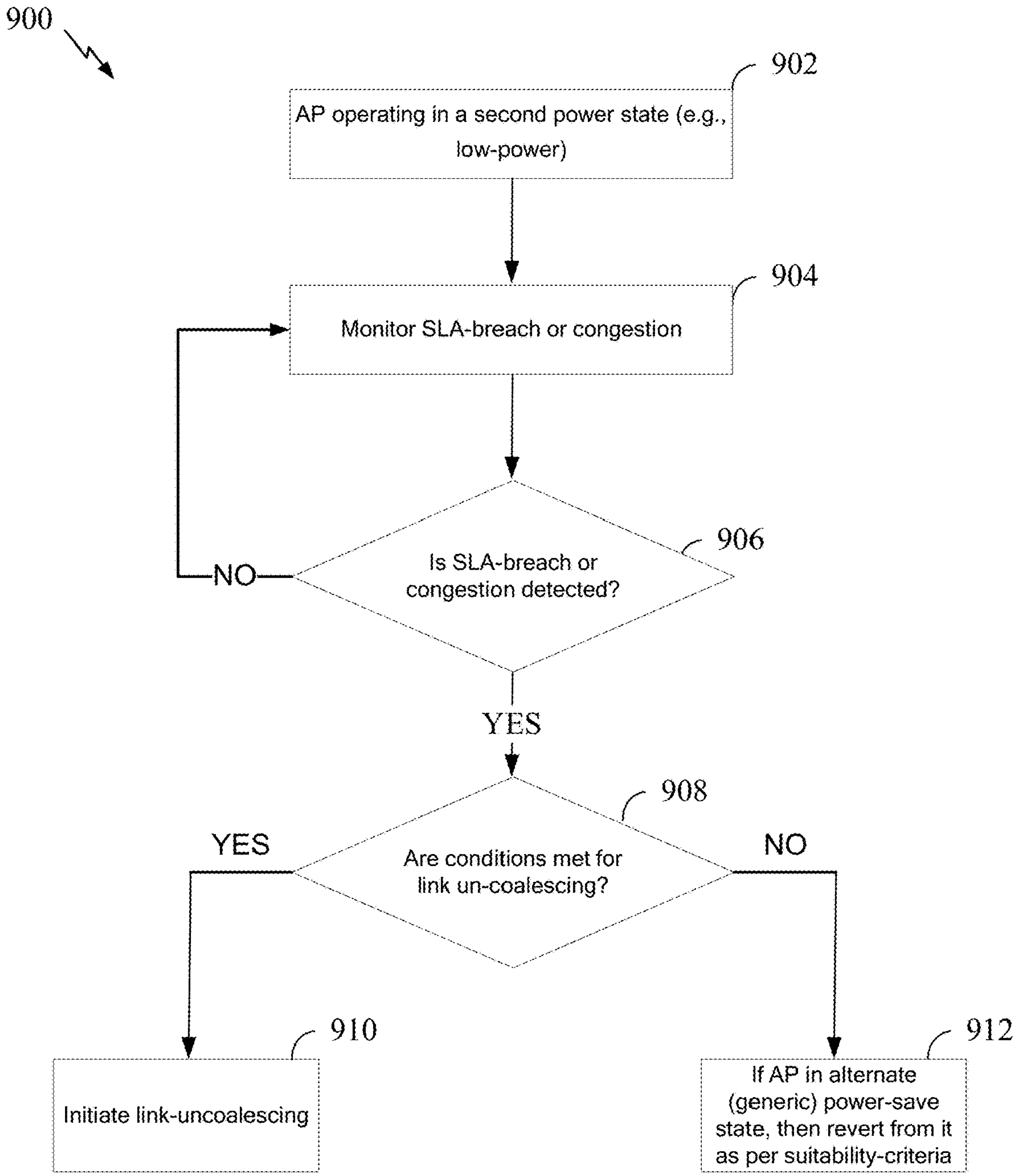
FIG. 9 shows a flow diagram illustrating an example of a power saving mechanism, in accordance with certain aspects of the present disclosure.

In some cases, links may be re-activated under certain conditions, effectively performing link un-coalescing. Link un-coalescing may be understood with reference to the flow diagram 900 of FIG. 9 and the diagrams in FIGS. 10 and 11. Like coalescing. un-coalescing may be contingent on a client's SLA conformance and based on link congestion levels.

As shown at 902, an AP may be operating in a second power state, such as a low power state (e.g., with one or more links de-activated after link coalescing). This may correspond to the top diagram shown in FIG. 10, with the AP 802 communicating with a STA 804 with the 2.4 GHz link inactive and the 5 GHZ and 6 GHZ links active.

As shown at 904, the AP may monitor for certain pre-conditions that might warrant link un-coalescing (re-activating a link), such as link congestion or a breach (failure to meet) an SLA condition. If such pre-conditions are met, as determined at 906, the AP may initiate link un-coalescing, at 910. Even if conditions for link un-coalescing are not met, the AP may perform other actions, such as reverting (exiting) from an alternate (generic) power-save state, based on certain criteria (at 912).

Figure 10:
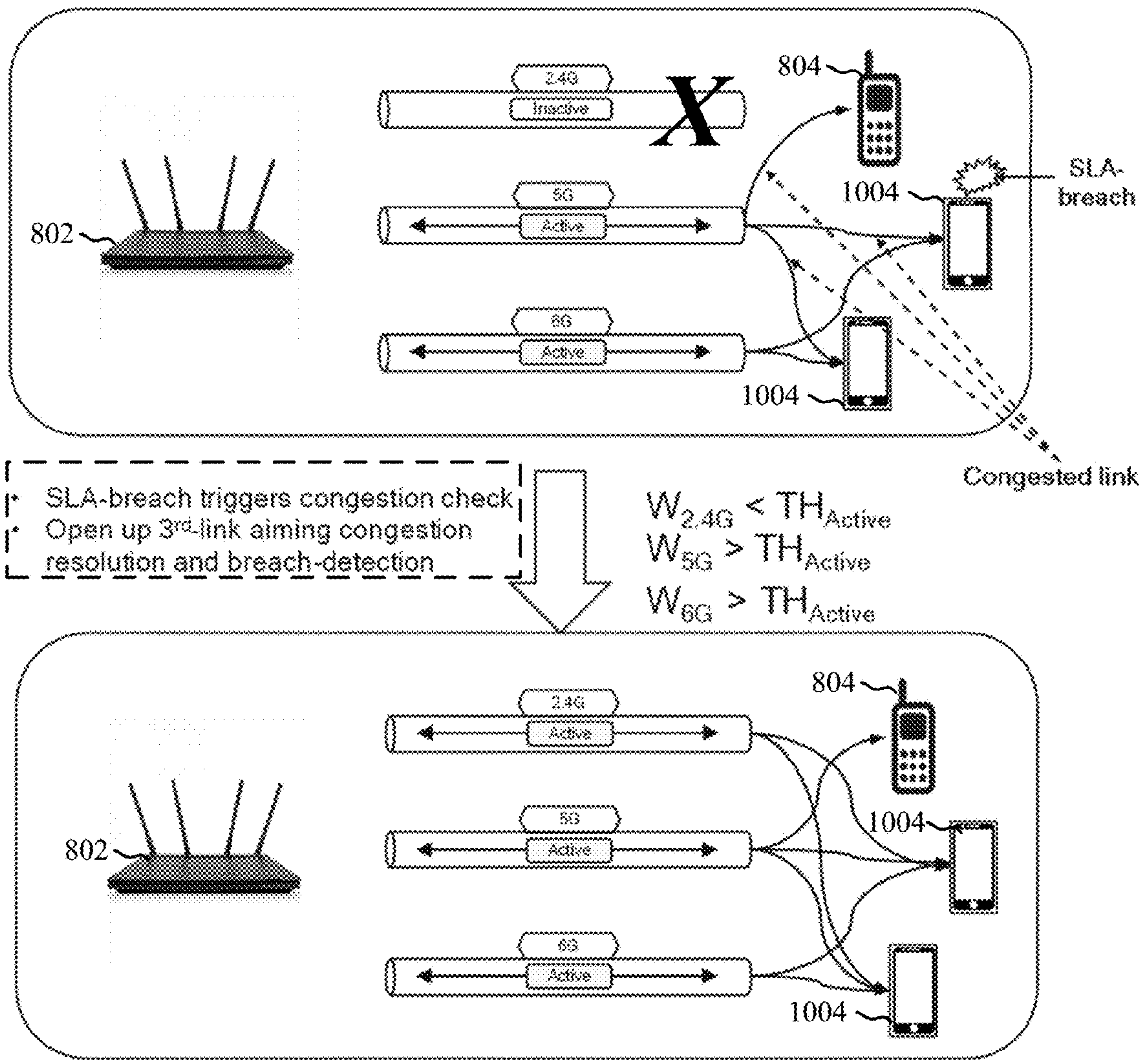
FIGS. 10 and 11 show diagrams illustrating examples of reverting from a power saving mechanism, in accordance with certain aspects of the present disclosure.
Figure 11:
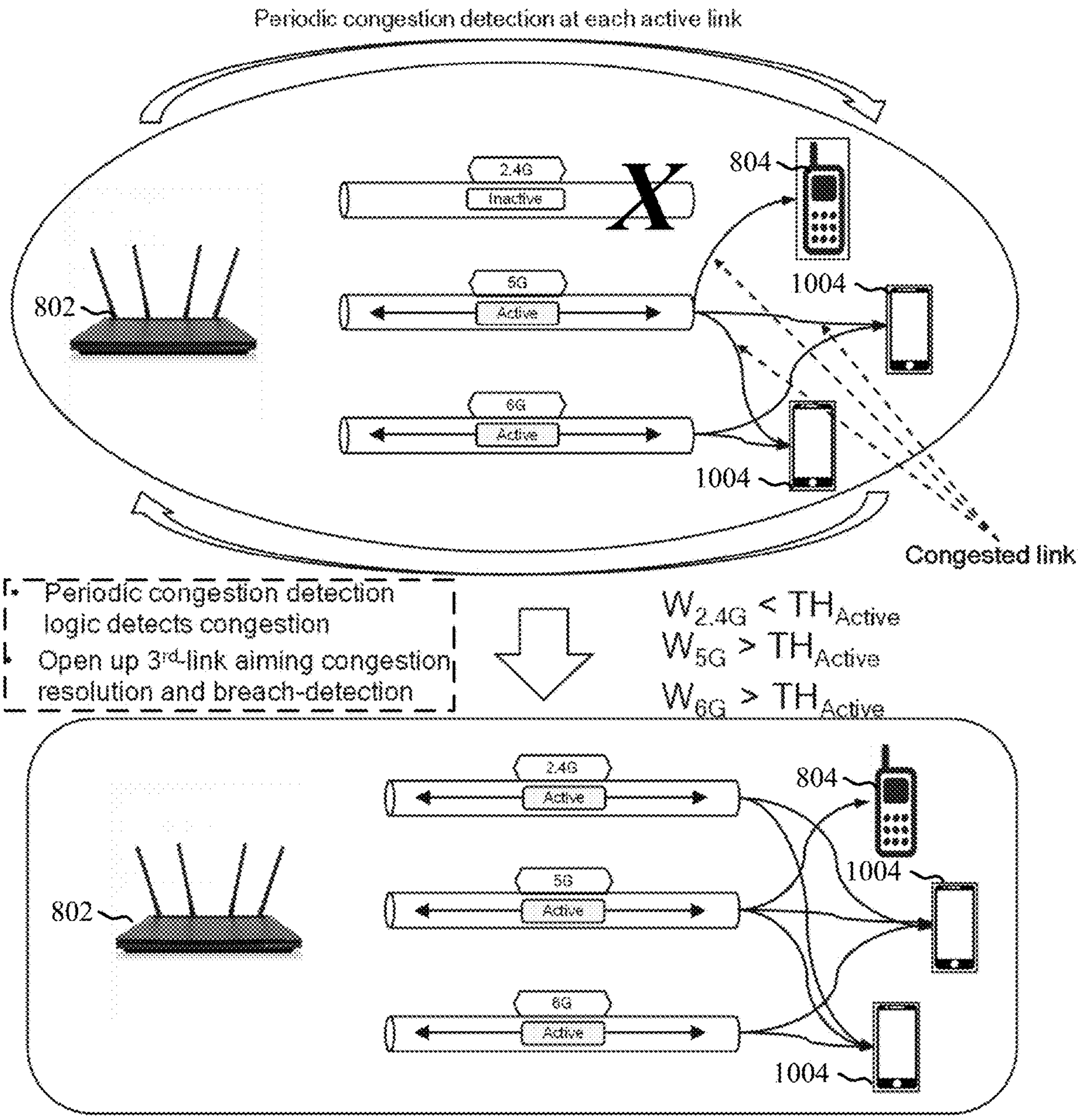

In the example shown in FIG. 10, an SLA breach triggers action that may lead to link un-coalescing in an effort to resolve the breach. As shown, the SLA breach may trigger a congestion check. In the illustrated example, the congestion check determines that at least the 5G link is congested, for example, due to serving additional STAs 1004 on this link.

A shown in the bottom diagram of FIG. 10, the AP performs link un-coalescing to restore (re-activate) the 2.4 GHz link, in an attempt to resolve the congestion (and/or the SLA breach). In the illustrated example, STAs 1004 establish a connection with AP 802 via this newly activated link, resolving congestion on the other link(s).

The example shown in FIG. 11 again assumes that the 2.4 GHz link is inactive, but that congestion checks are performed periodically (rather than relying on an SLA-breach triggered congestion check). In the illustrated example, a periodic congestion check detects congestion. In this case, again shown in the bottom diagram, the AP restores the 2.4 GHz link, in an attempt to resolve the congestion.

As described above, weights calculated for each active link may be used to drive the power saving mechanisms proposed herein, factoring in the decisions to perform link coalescing or un-coalescing. Weights may be calculated by a function generally designed to generate a metric that gauges link loading.

Weights for any particular link may be calculated as a function of a variety of different parameters. In some cases, these parameters may include a combination of link-level parameters and peer-level parameters. These parameters may be obtained by the AP, for example, through a combination of monitoring and reporting from peer stations.

The link-level parameters may be used for deciding when to perform link-coalescing and other (generic) power saving techniques. Link level parameters may include, for example, a combination of: channel idle-time ($C_{idle}$), a number of associated peers per-link ($N_{assoc\text{-}peer}$), a number of active peers per-link ($N_{active\text{-}peer}$), a maximum bandwidth across all peers ($BW_{max}$), a maximum number of RF chains across all peers ($n\_chain_{max}$), transmit power ($Tx_{pwr}$), and network residency (NR). As used herein, network residency generally refers to an average presence on a link, in a power management (PM) state indicating an active link (PM=0), of all associated clients. In contrast, per-client (per-peer) link residency (LR) generally refers to an average time spent on an active link state (in PM=0) within an observation window.

Peer level parameters may be used to calculate a peer level weight, $W_{Link}$(peer), that contributes towards per-link weight derivation. Peer level parameters may include, for example, a combination of: bandwidth (BW), a number of Tx/Rx chains (n_chain), a service level agreement (SLA) indicator, and per link traffic utilization ($TxRxUtil_{per\_link}$). The peer level parameters may also include various statistics, such as a receive signal strength indicator (RSSI), link residency (LR), and packet error rate (PER).

Link weights may be calculated as a function of the link-level parameters noted above, as well as the peer dependent weight $W_{Link}$(peer):

$$W_{Link}(AP) = f\left(C_{idle}, N_{assoc-peer}, N_{active-peer}, BW_{max}, \text{n\_chain}_{max}, Tx_{pwr}, NR, W_{Link}(\text{peer})\right).$$

The particular form of the functions described herein (e.g., and how they factor/weigh each parameter) may vary with different embodiments and may be implementation specific. The peer dependent weight $W_{Link}$(peer) may be calculated as a function of the peer-level parameters as follows:

$$W_{Link}(\text{peer}) = f(BW, \text{n\_chain}, SLA, RSSI, LR, PER, TxRxUtil_{per\_link}).$$

In some cases, a separate weight $W_{gr\text{-}ap}$ may be calculated that serves as Metric for generic power saving techniques:

$$W_{gr-ap}(AP) = f\left(BW_{max}, N_{assoc-peer}, N_{active-peer}, C_{idle}\right).$$

For example, the weight may be used to activate (or revert from) the following power saving mechanisms: BW reduction, RF chain reduction, a change, or a change in certain operating states, such as a peripheral bus power management state, or an energy efficient Ethernet power state. Examples of peripheral bus power management states may include, for example, Peripheral Component Interconnect Express (PCIe) states that include moderate and maximum power saving states. Examples of energy efficient Ethernet power states include higher power (data mode) and lower power (idle) states defined per IEEE 802.3az.

In some cases, an AP may check that one or more pre-conditions are met before performing the power saving mechanisms proposed herein. The particular pre-conditions may depend on a type of peer station on a link. Similarly, a particular mechanism utilized to achieve power saving (e.g., via link coalescing) may depend on the type of peer station.

Figure 12:
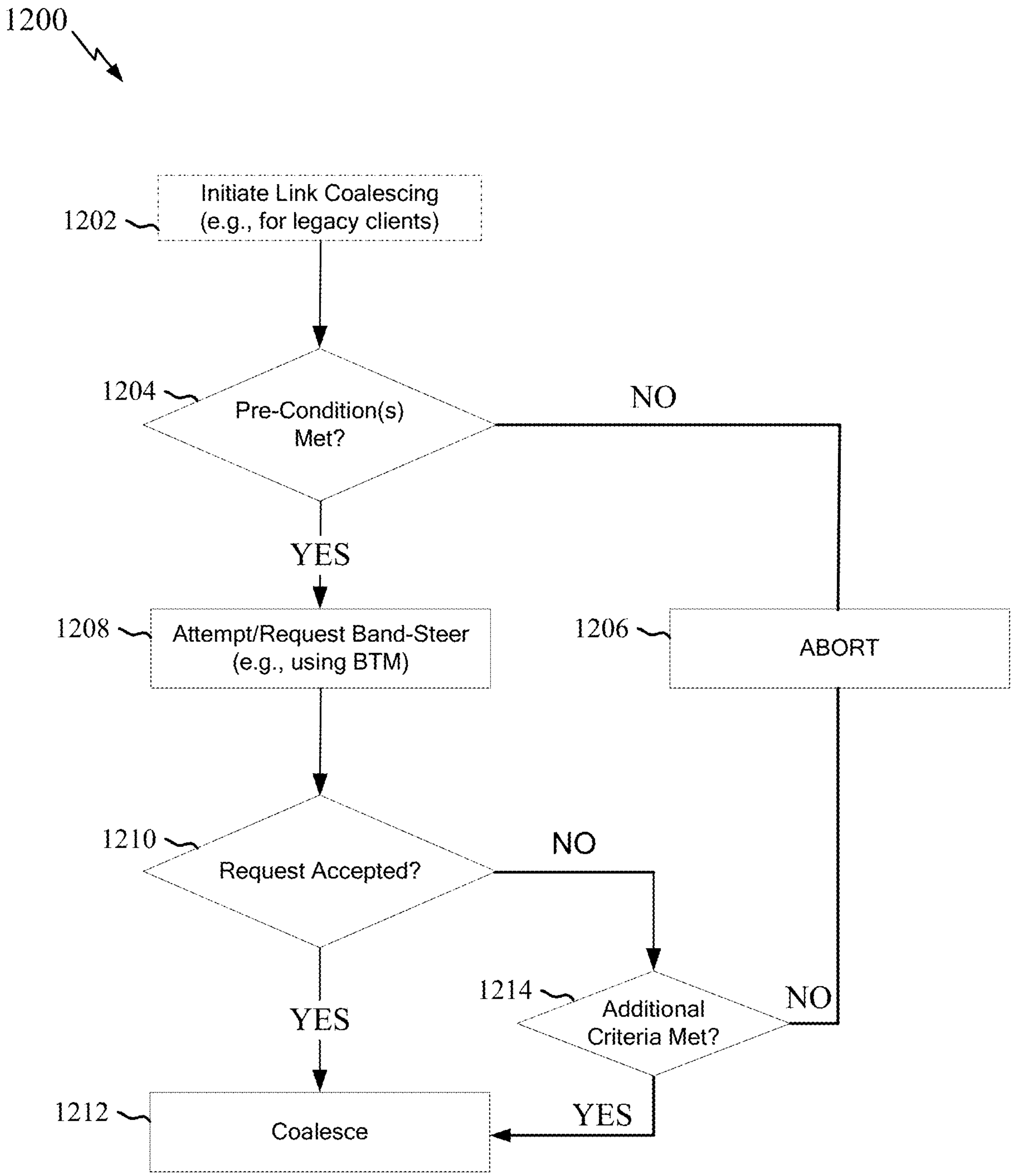
FIG. 12 shows a flow diagram illustrating another example of a power saving mechanism, in accordance with certain aspects of the present disclosure.
Figure 13:
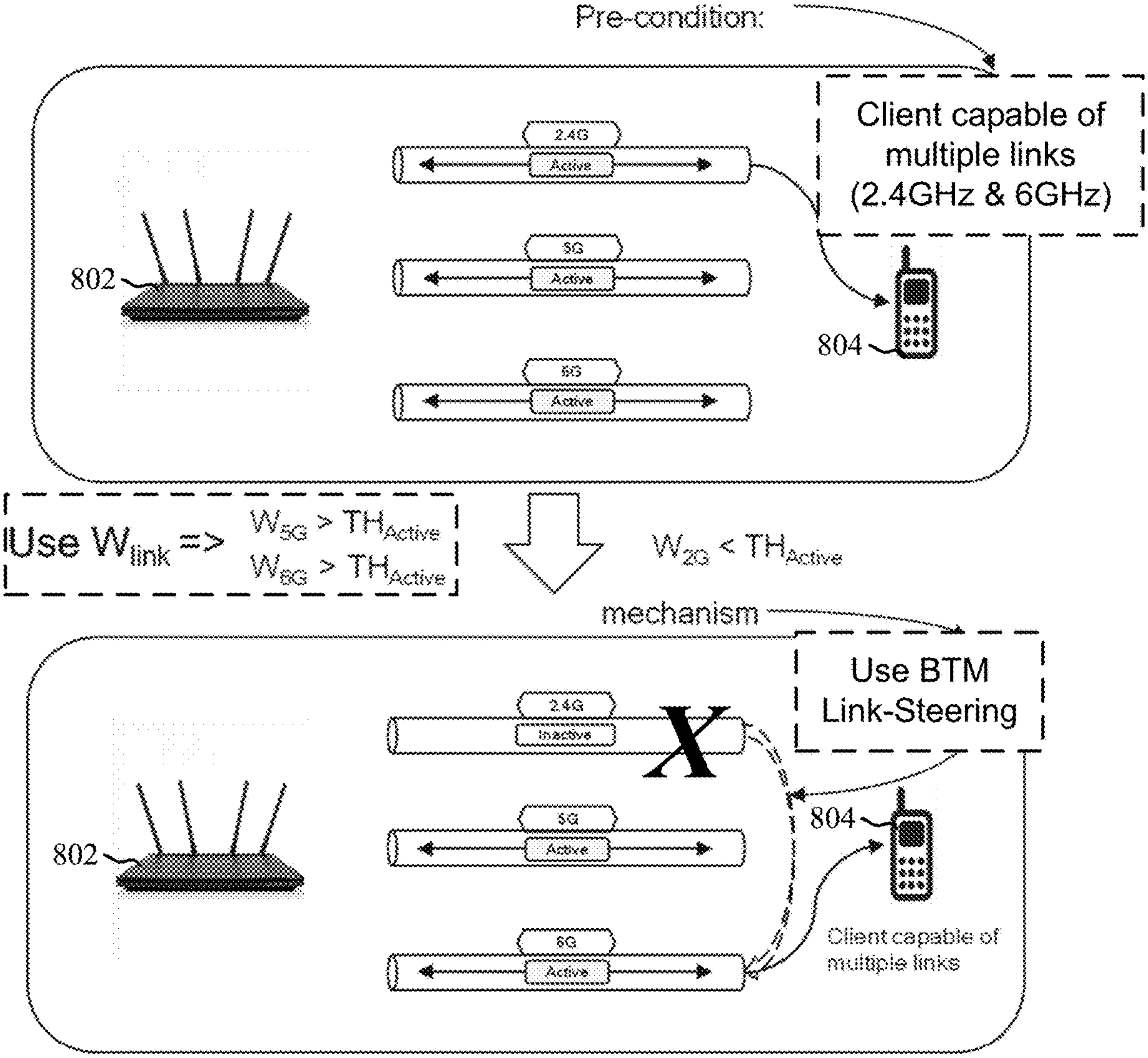
FIGS. 13-16 show diagrams illustrating examples of power saving mechanisms, in accordance with certain aspects of the present disclosure.
Figure 14:
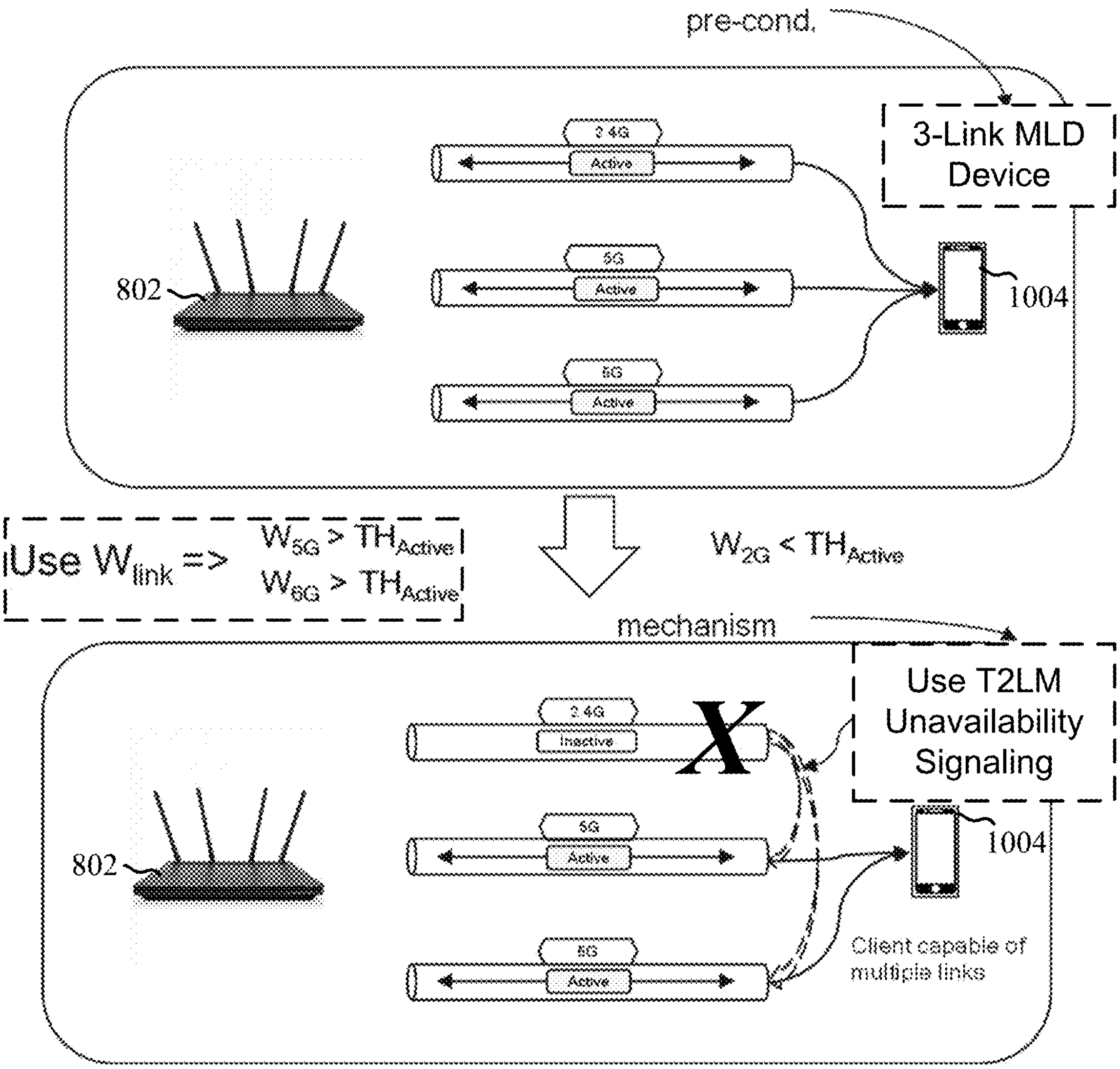

The use of different pre-conditions and mechanisms may be understood with reference to the flow diagram 1200 of FIG. 12 and the diagrams in FIGS. 13 and 14.

The operations in FIG. 12 may be performed, for example, in an attempt to perform link coalescing for a peer station that is a legacy device, such as a device that is only compliant with a standard before 802.11 be (e.g., a pre-802.11 be station).

As illustrated, when initiating link coalescing for such a client (at 1202), the AP may determine if one or more pre-conditions are met. As illustrated in FIG. 13, for a legacy station, a pre-condition may be that the client is capable of supporting multiple links (e.g., 2.4 GHz and 5 GHZ). If the pre-condition is not met, the link coalescing attempt may be aborted, at 1206 (as the device may not be able to support mechanisms used for link coalescing and un-coalescing).

If the pre-condition is met, the AP may attempt (request) band steering, for example via a BSS Transition Management (BTM) message. If the request is accepted, as determined at 1210, the link may be coalesced, as indicated at 1212.

If the request is not accepted, the AP may determine at 1214, if one or more additional criteria are met. If the additional criteria are not met, the link coalescing attempt may be aborted, at 1206. If the additional criteria are met, however, the link coalescing may still be performed, at 1212.

Examples of the additional criteria may be understood by considering an example of an attempt to perform link coalescing for a legacy device. For example, the AP may attempt (request for the device) to band steer such a device by dispatching a (BTM) message. Some devices may accept the request and move to a target band (e.g., one of the remaining active links, allowing the other link to be inactivated. For example, in the bottom diagram of FIG. 1, the client STA 804 is successfully moved from the 2.4 GHz link (which is then inactivated) to the 6 GHz link.

Other devices may reject the request to band steer. In such cases, as shown in FIG. 12, the criteria may be applied to decide whether to abort or still perform link coalescing.

In some cases, the criteria may involve the type of device. For example, if the device is an Internet of Things (IOT) or sensor device, it may be connected to a certain band and not be capable of moving (or capable of associating after a move-and may not meet the pre-condition of operating on multiple links), so the attempt may be aborted. For other types of devices, however, the link coalescing may be performed anyway.

In some cases, the criteria may involve signal strength of the device. For example, if a legacy client is observing very strong RSSI (which may be reported to the AP), it may be unlikely that it will move if requested. In this case, the link coalescing may be aborted. On the other hand, if the legacy client is observing weak RSSI (and the client is rejecting the request for some other reason), link coalescing may be performed anyway (e.g., and the device may be allowed to roam).

Referring now to FIG. 14, another example of a pre-condition is that a device support multi-link operation (MLO). As illustrated, in this case, the AP may perform link coalescing using T2LM. For example, in the bottom diagram of the example illustrated in FIG. 14, the 2.4 GHz link may be de-activated using T2LM to signal unavailability of that link.

Figure 15:
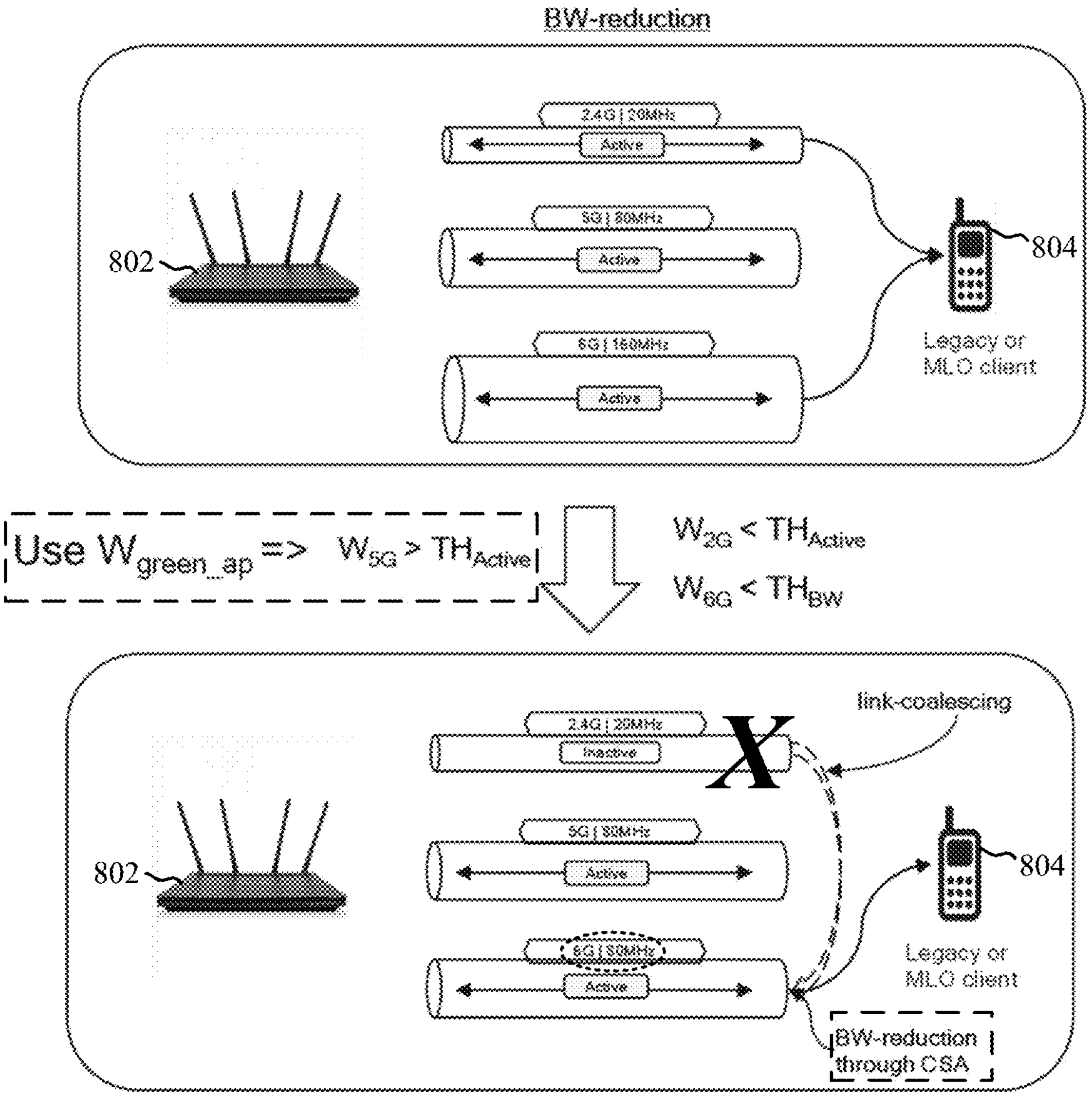
Figure 16:
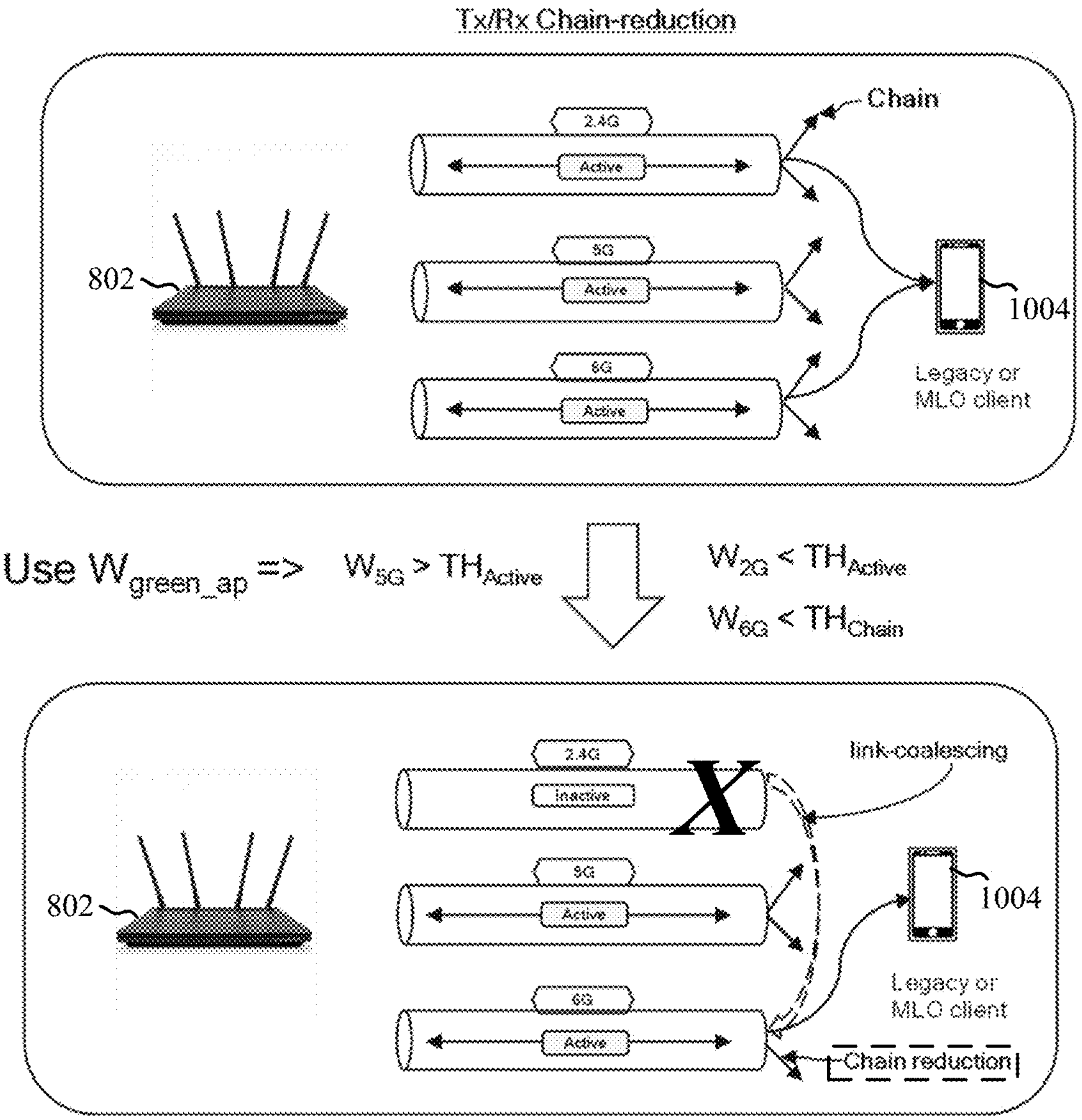

FIGS. 15 and 16 illustrate examples of how additional power saving mechanisms may be used as an alternative, or in addition, to link coalescing. In both examples, a (legacy or MLO) client station is initially operating on two links (2.4 GHz and 6 GHz). Based on the link weights, link coalescing is performed to inactivate the 2.4 GHz link.

As shown in the bottom diagrams, based on the additional weights $W_{gr-ap}$, in addition to link coalescing, additional power saving mechanisms may be used.

Referring to FIG. 15, the additional power saving mechanisms may include bandwidth reduction through a channel switch announcement (CSA) based on a comparison of a weight to a bandwidth related threshold. For example, if a weight for the 6 GHz link is below a BW related threshold ($W_{6G}<TH_{BW}$), bandwidth reduction on this link may be achieved through a CSA.

Referring to FIG. 16, the additional power saving mechanisms may include chain reduction based on a comparison of a weight to a chain related threshold. For example, if a weight for the 6 GHz link is below a chain related threshold ($W_{6G}<TH_{CHAIN}$), chain reduction may be performed on this link.

As noted above, other examples of additional power saving mechanisms include a change in a peripheral bus power management state change in an energy efficient Ethernet power state.

Figure 17:
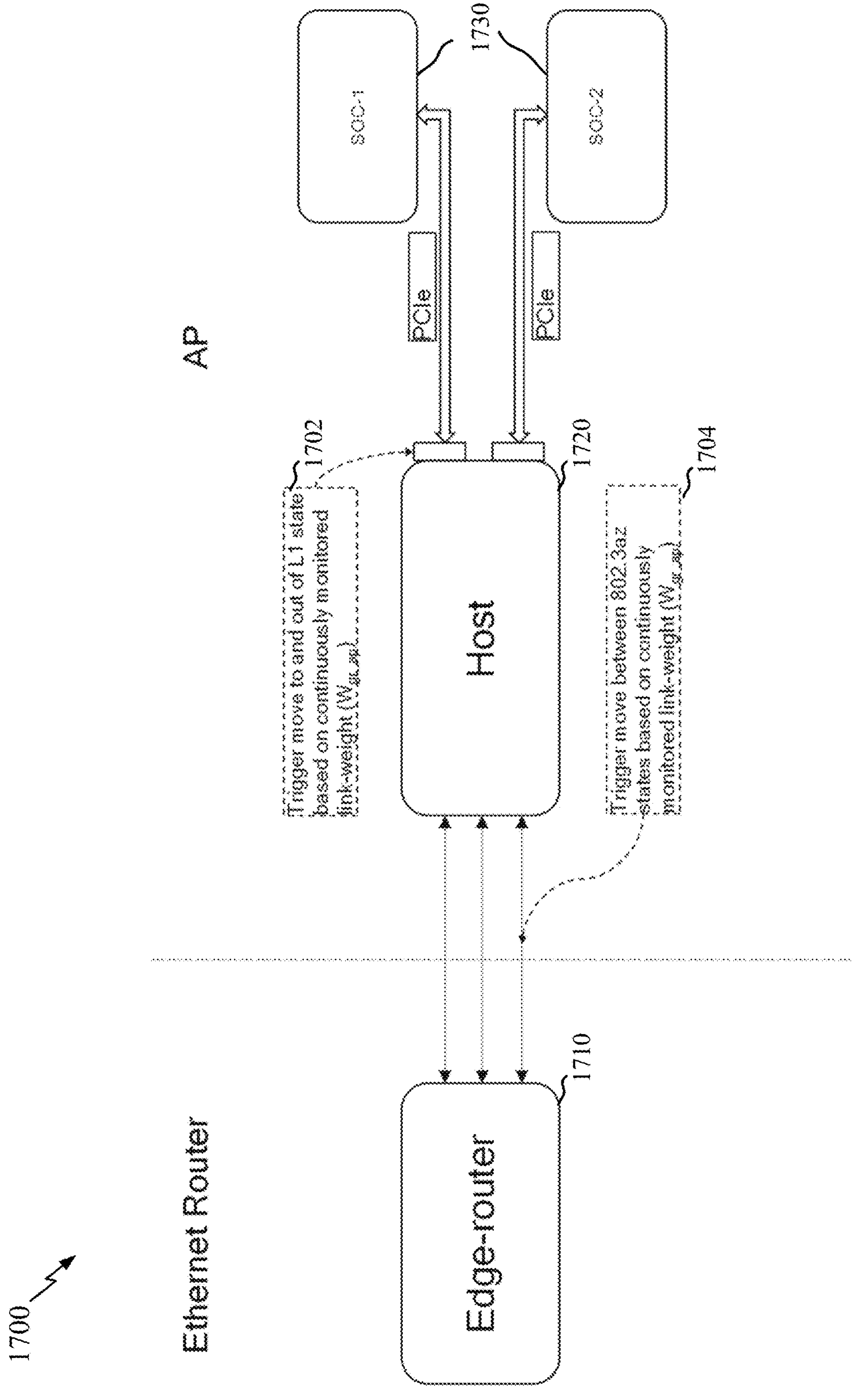
FIG. 17 shows a diagram illustrating a system that may implement a power saving mechanism, in accordance with certain aspects of the present disclosure.

These power saving mechanisms are shown in example 1700 of FIG. 17. As illustrated at 1702, a move to (and/or out of) an L1 state (a PCIe power saving state) may be triggered based on (continuously) monitored link-weight ($W_{gr\_ap}$). Similarly, as illustrated at 1704, a move between 802.3az states (e.g., higher power and lower power states) may be triggered based on (continuously) monitored link-weight ($W_{gr\_ap}$).

The power savings mechanisms proposed herein that may help mitigate the increase in power consumption associated with advanced network features. The techniques may help reduce overall power consumption in a network, which may help reduce energy costs associated with operating the network. The power savings mechanisms proposed herein may also allow help avoid costly parts expensive heat sinks and power-adapters, which may help reduce the build cost.

Figure 18:
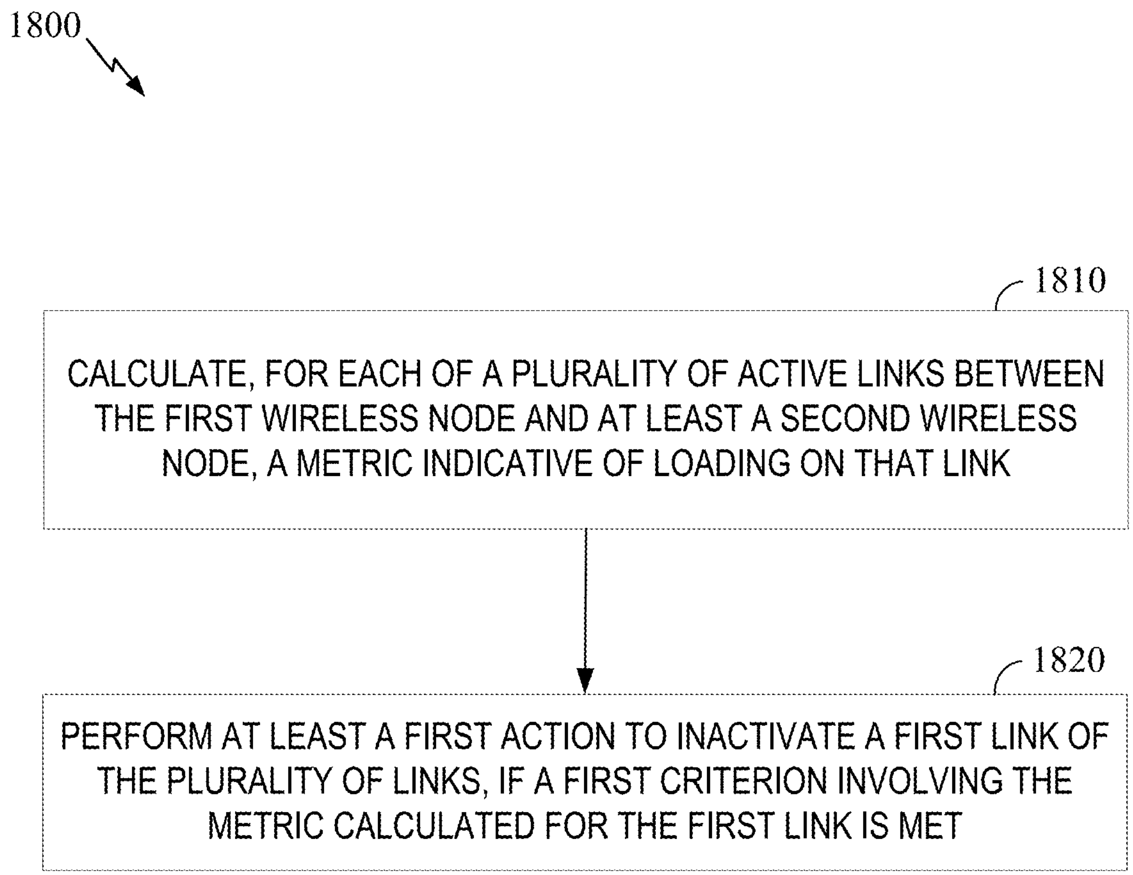
FIG. 18 shows a flowchart illustrating an example process performable by a first wireless node configured as an AP.

FIG. 18 shows a flowchart illustrating a process 1800 performable at a first wireless node, according to some aspects of the present disclosure. The operations of the process 1800 may be implemented by the first wireless node or its components as described herein. For example, the process 1800 may be performed by a wireless communication device, such as a wireless communication device 1900 described with reference to FIG. 19, operating as or within the first wireless node. In some examples, the process 1800 may be performed by the first wireless node, such as one of the wireless APs 102 described with reference to FIG. 1. The operations of the process 1800 and subject matter of the present disclosure may be applicable for different systems.

At 1810, the process 1800 includes the first wireless node calculating, for each of a plurality of active links between the first wireless node and at least a second wireless node, a metric indicative of loading on that link.

At 1820, the process 1800 includes the first wireless node performing at least a first action to inactivate a first link of the plurality of links, if a first criterion involving the metric calculated for the first link is met.

In some aspects, the method 1800 further includes performing at least a second action to reactivate the first link, if a second criterion is met.

In some aspects, the second criterion involves at least one of: a failure to meet a quality of service (QoS) objective; or a detection of congestion on at least a second link of the plurality of active links.

In some aspects, the plurality of active links comprise active links on different frequency bands.

In some aspects, the metric for each of the plurality of links is calculated periodically.

In some aspects, the first criterion is met if the metric is below a threshold value.

In some aspects, the method 1800 further includes applying at least one power saving scheme, if the first criterion is not met and at least one other criterion is met.

In some aspects, the at least one power saving scheme involves at least one of: bandwidth reduction; radio frequency (RF) chain reduction; or a change in a certain operating state.

In some aspects, the at least one other criterion involves at least one of a failure to meet a quality of service (QOS) objective; or a detection of congestion on one or more of the plurality of active links.

Figure 19:
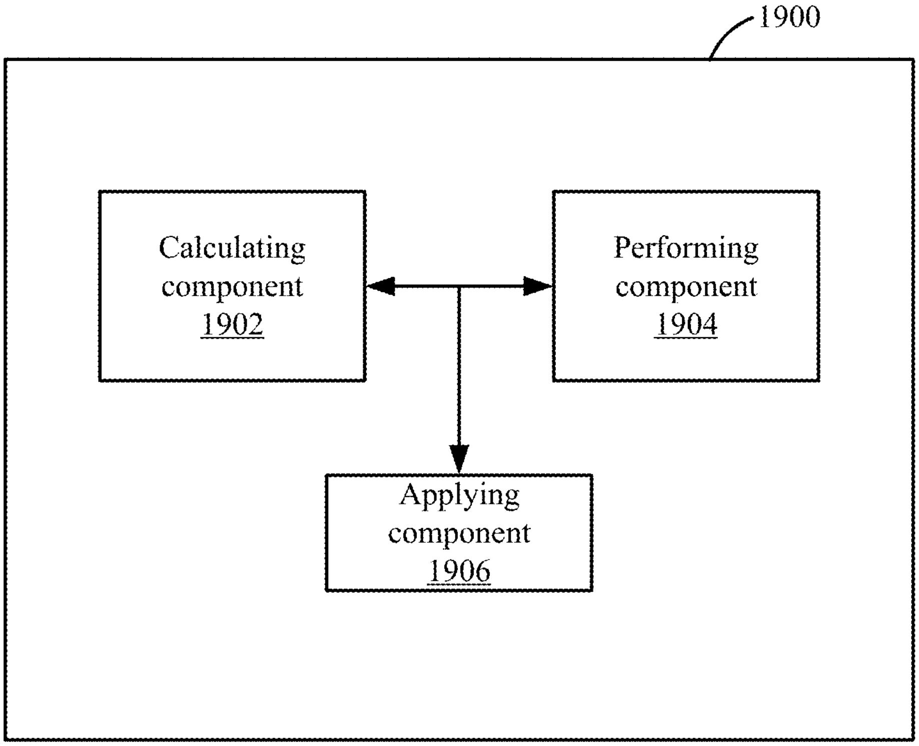
FIG. 19 shows a block diagram of an example wireless communication device.

FIG. 19 shows a block diagram of a wireless communication device 1900 (such as an AP or non-AP STA), according to some aspects of the present disclosure. In one example, the wireless communication device 1900 is configured or operable to perform a process 1800 described with reference to FIG. 18. In various examples, the wireless communication device 1800 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 1900 can be a device for use in an AP, such as AP 102 described with reference to FIG. 1. In some other examples, the wireless communication device 1900 can be an AP that includes a chip, SoC, chipset, package or device as well as multiple antennas. The wireless communication device 1900 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1900 also includes or can be coupled with an application processor which may be further coupled with another memory. In some examples, the wireless communication device 1900 further includes at least one external network interface that enables communication with a core network or backhaul network to gain access to external networks including the Internet.

The wireless communication device 1900 includes calculating component 1902, performing component 1904, and encrypting component 1906.

Portions of one or more of the components 1902, 1904, and/or 1906 may be implemented at least in part in hardware or firmware. In some examples, at least some of the components 1902, 1904, and/or 1906 are implemented at least in part by a processor and as software stored in a memory. For example, portions of one or more of the components 1902. 1904, and/or 1906 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the wireless communication device 1900). For example, a processing system of the wireless communication device 1900 may refer to a system including the various other components or subcomponents of the wireless communication device 1900, such as the processor, or a transceiver, or a communications manager, or other components or combinations of components of the wireless communication device 1900. The processing system of the wireless communication device 1900 may interface with other components of the wireless communication device 1900, and may process information received from other components (such as inputs or signals) or output information to other components. For example, a chip or modem of the wireless communication device 1900 may include a processing system, a first interface to output information and a second interface to obtain information. In some implementations, the first interface may refer to an interface between the processing system of the chip or modem and a transmitter, such that the wireless communication device 1900 may transmit information output from the chip or modem. In some implementations, the second interface may refer to an interface between the processing system of the chip or modem and a receiver, such that the wireless communication device 1900 may obtain information or signal inputs, and the information may be passed to the processing system. A person having ordinary skill in the art will readily recognize that the first interface also may obtain information or signal inputs, and the second interface also may output information or signal outputs.

The obtaining component 1902 may be capable of, configured to, or operable to at least obtain a first request that requests the first wireless node to modify the wireless operating parameters.

The outputting component 1904 may be capable of, configured to, or operable to at least output, for transmission, information that indicates at least one of (i) one or more criteria that, when met by a second wireless node, indicate the second wireless node is allowed to request that the first wireless node modify one or more wireless operating parameters, or (ii) one or more options for modifying the wireless operating parameters of the first wireless node.

The encrypting component 1906 may be capable of, configured to, or operable to at least encrypt content of the response to the first request.

Various components of the wireless communication device 1900 may provide means for performing the process 1800 described with reference to FIG. 18, or any aspect related to it. Means for receiving or obtaining may include transceivers and/or antenna(s) of the AP 102 described with reference to FIG. 1.

Means for calculating may include one or more processors (such as a receive processor, a controller, and/or a transmit processor) of the AP 102 described with reference to FIG. 1 and/or the calculating component 1902 of the wireless communication device 1900. Means for performing may include one or more processors (such as a receive processor, a controller, and/or a transmit processor) of the AP 102 described with reference to FIG. 1 and/or the performing component 1904 of the wireless communication device 1900. Means for applying may include one or more processors (such as a receive processor, a controller, and/or a transmit processor) of the AP 102 described with reference to FIG. 1 and/or the applying component 1906 of the wireless communication device 1900.

In some cases, rather than actually transmitting, for example, signals and/or data, the wireless communication device 1900 may have an interface to output signals and/or data for transmission (means for outputting). For example, a processor may output signals and/or data, via a bus interface, to a radio frequency (RF) front end of the wireless communication device 1900 for transmission. In various aspects, the RF front end may include various components, including transmit and receive processors, transmit and receive MIMO processors, modulators, demodulators, and the like.

In some cases, rather than actually receiving signals and/or data, the wireless communication device 1900 may have an interface to obtain the signals and/or data received from another device (means for obtaining). For example, a processor may obtain (or receive) the signals and/or data, via a bus interface, from an RF front end of the wireless communication device 1900 for reception. In various aspects, the RF front end may include various components, including transmit and receive processors, transmit and receive MIMO processors, modulators, demodulators, and the like.

EXAMPLE CLAUSES

Implementation examples are described in the following numbered clauses:

Clause 1: A method for wireless communications at a first wireless node, comprising: calculating, for each of a plurality of active links between the first wireless node and at least a second wireless node, a metric indicative of loading on that link; and performing at least a first action to inactivate a first link of the plurality of links, if a first criterion involving the metric calculated for the first link is met.

Clause 2: The method of Clause 1, wherein the plurality of active links comprise active links on different frequency bands.

Clause 3: The method of any one of Clauses 1 to, wherein the metric for each of the plurality of links is calculated periodically.

Clause 4: The method of any one of Clauses 1 to, wherein the first criterion is met if the metric is below a threshold value.

Clause 5: The method of any one of Clauses 1 to, further comprising performing at least a second action to reactivate the first link, if a second criterion is met.

Clause 6: The method of Clause 5, wherein the second criterion involves at least one of: a failure to meet a quality of service (QOS) objective; or a detection of congestion on at least a second link of the plurality of active links.

Clause 7: The method of any one of Clauses 1 to, further comprising applying at least one power saving scheme, if the first criterion is not met and at least one other criterion is met.

Clause 8: The method of Clause 7, wherein the at least one power saving scheme involves at least one of: bandwidth reduction; radio frequency (RF) chain reduction; a peripheral bus power management state; or an Ethernet power state.

Clause 9: The method of Clause 7, wherein the at least one other criterion involves at least one of: a failure to meet a quality of service (QOS) objective; or a detection of congestion on one or more of the plurality of active links.

Clause 10: The method of any one of Clauses 1 to, wherein calculating the metric indicative of loading on a link is based on one or more first parameters associated with that link.

Clause 11: The method of Clause 10, wherein the one or more first parameters comprise at least one of: a channel idle time; a number of associated peers; a number of active peers; a maximum bandwidth across peers; a maximum quantity of radio frequency (RF) chains; transmit power; or an average presence of clients active on that link.

Clause 12: The method of Clause 10, wherein calculating the metric indicative of loading on a link is further based on one or more second parameters associated with at least one peer node on that link.

Clause 13: The method of Clause 12, wherein the second plurality of parameters comprise at least one of: bandwidth; a quantity of radio frequency (RF) chains; a quality of service (QOS) objective; or one or more link-level statistics.

Clause 14: The method of any one of Clauses 1 to, wherein the first action to inactivate the first link involves at least one of: band steering via basic service set (BSS) transition management (BTM); or traffic identifier (TID) to Link Mapping (T2LM).

Clause 15: The method of any one of Clauses 1 to, wherein the first action to inactivate the first link is performed only if a condition involving the second wireless node is met.

Clause 16: The method of Clause 15, wherein the condition is met if the second wireless device is capable of communicating on multiple links.

Clause 17: The method of Clause 15, wherein the condition involves at least one of: a type of the second wireless node; or a signal strength, associated with the first link, observed at the second wireless node.

Clause 18: An apparatus, comprising: a memory comprising executable instructions; and at least one processor configured to execute the executable instructions and cause the apparatus to perform a method in accordance with any one of Clauses 1-17.

Clause 19: An apparatus, comprising means for performing a method in accordance with any one of Clauses 1-17.

Clause 20: A non-transitory computer-readable medium comprising executable instructions that, when executed by at least one processor of an apparatus, cause the apparatus to perform a method in accordance with any one of Clauses 1-17.

Clause 21: A computer program product embodied on a computer-readable storage medium comprising code for performing a method in accordance with any one of Clauses 1-17.

Clause 22: wireless node comprising: at least one transceiver, a memory comprising executable instructions; and a processor configured to execute the executable instructions and cause the wireless node to perform a method in accordance with any one of Clauses 1-17, wherein the at least one transceiver is configured to at least one of transmit to or receive from the second wireless node on at least one of the plurality of active links.

ADDITIONAL CONSIDERATIONS

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The invention claimed is:

1. An apparatus for wireless communications, comprising:

at least one transceiver;

at least one processor; and at least one memory configured to store instructions executable by the at least one processor to cause the apparatus to:

calculate, for each of a plurality of active links between the apparatus and at least one wireless node, a metric indicative of loading on that link;

perform at least a first action to inactivate a first link of the plurality of active links, when a first criterion involving the metric calculated for the first link is met; and apply at least one power saving scheme, when the first criterion is not met, wherein the at least one transceiver is configured to at least one of transmit to or receive from the at least one wireless node via at least one of the plurality of active links.

2. The apparatus of claim 1, wherein the plurality of active links comprise active links on different frequency bands.

3. The apparatus of claim 1, wherein the metric for each of the plurality of active links is calculated periodically.

4. The apparatus of claim 1, wherein the first criterion is met if the metric is below a threshold value.

5. The apparatus of claim 1, wherein the at least one processor is further configured to cause the apparatus to perform at least a second action to reactivate the first link, if a second criterion is met.

6. The apparatus of claim 5, wherein the second criterion involves at least one of:
- a failure to meet a quality of service (QoS) objective; or
- a detection of congestion on at least a second link of the plurality of active links.

7. The apparatus of claim 1, wherein the at least one power saving scheme is applied when also at least one other criterion is met.

8. The apparatus of claim 7, wherein the at least one power saving scheme involves at least one of:
- bandwidth reduction;
- radio frequency (RF) chain reduction;
- a peripheral bus power management state; or
- an Ethernet power state.

9. The apparatus of claim 7, wherein the at least one other criterion involves at least one of:
- a failure to meet a quality of service (QOS) objective; or
- a detection of congestion on one or more of the plurality of active links.

10. The apparatus of claim 1, wherein calculating the metric indicative of loading on a link is based on one or more first parameters associated with that link.

11. The apparatus of claim 10, wherein the one or more first parameters comprise at least one of:
- a channel idle time;
- a number of associated peers;
- a number of active peers;
- a maximum bandwidth across peers;
- a maximum quantity of radio frequency (RF) chains;
- transmit power; or
- an average presence of clients active on that link.

12. The apparatus of claim 10, wherein calculating the metric indicative of loading on a link is further based on one or more second parameters associated with at least one peer node on that link.

13. The apparatus of claim 12, wherein the one or more second parameters comprise at least one of:
- bandwidth;
- a quantity of radio frequency (RF) chains;
- a quality of service (QOS) objective; or
- one or more link-level statistics.

14. The apparatus of claim 1, wherein the first action to inactivate the first link involves at least one of:
- band steering via basic service set (BSS) transition management (BTM); or
- traffic identifier (TID) to Link Mapping (T2LM).

15. The apparatus of claim 1, wherein the first action to inactivate the first link is performed only if a condition involving the at least one wireless node is met.

16. The apparatus of claim 15, wherein the condition is met if the at least one wireless node is capable of communicating on multiple links.

17. The apparatus of claim 15, wherein the condition involves at least one of:
- a type of the at least one wireless node; or
- a signal strength, associated with the first link, associated with the at least one wireless node.

18. A method for wireless communications by a first wireless node, comprising:
- calculating, for each of a plurality of active links between the first wireless node and at least a second wireless node, a metric indicative of loading on that link;
- performing at least a first action to inactivate a first link of the plurality of active links, when a first criterion involving the metric calculated for the first link is met;
- applying at least one power saving scheme, when the first criterion is not met; and
- transmitting to or receiving from the second wireless node via at least one of the plurality of active links.

19. The apparatus of claim 1, wherein the apparatus is configured to operate as an access point (AP).

20. A non-transitory computer-readable medium having instructions stored thereon, that when executed by one or more processors, cause an apparatus to:
- calculate, for each of a plurality of active links between a first wireless node and at least a second wireless node, a metric indicative of loading on that link;
- perform at least a first action to inactivate a first link of the plurality of active links, when a first criterion involving the metric calculated for the first link is met;
- apply at least one power saving scheme, when the first criterion is not met; and
- transmit to or receive from the second wireless node via at least one of the plurality of active links.

* * * * *